United States Patent Office 3,689,246
Patented Sept. 5, 1972

3,689,246
SOLUTIONS OF AMMONIUM NITRATE, SULFATE
AND CHLORIDE CONTAINING A THIOSULFATE
AS DEFOLIANTS AND DESICCANTS
Donald C. Young, Fullerton, Calif., assignor to Union
Oil Company of California, Los Angeles, Calif.
No Drawing. Continuation-in-part of applications Ser. No.
421,688, Dec. 28, 1964, and Ser. No. 577,827, Sept. 8,
1966. This application Feb. 26, 1969, Ser. No. 802,648
Int. Cl. A01n 5/00, 11/02
U.S. Cl. 71—69    6 Claims

ABSTRACT OF THE DISCLOSURE

The invention comprises the application of aqueous solutions comprising a thiosulfate salt to the foliage of mature plants to effect desiccation and in some instances defoliation of the plants and thereby facilitate harvesting of the crops. The treatment can be applied to any plants where the desiccation or defoliation of the plant foliage would be desired, including cotton, potatoes, sugar beets, sugar cane, peppers, milo, roses, pineapple, alfalfa, tomatoes, grapes, etc. A surface active agent can be incorporated in the solution to facilitate wetting of the foliage by the applied solution and aerial or ground rig applications can be employed.

DESCRIPTION OF THE INVENTION

This application is a continuation-in-part of applications Ser. No. 421,688, filed Dec. 28, 1964, now abandoned, and Ser. No. 577,827, filed Sept. 8, 1966, now abandoned.

The invention comprises the application of aqueous solutions comprising a thiosulfate salt, e.g., ammonium thiosulfate, either alone or combined with ammonium salts and/or lithium chloride or other desiccants to plants in amounts sufficient to effect desiccation and/or defoliation of the plants.

The use of aqueous solutions as defoliants and desiccants has resulted from the recent improvements in harvesting machinery which permit satisfactory crop harvesting when the plant leaves have been desiccated, even though the plant has not been completely defoliated. The application of the concentrated solution effects defoliation of some of the plant leaves and desiccation of any remaining leaves on the plant. Various concentrated aqueous solutions have been previously suggested for use as defoliants and desiccants. Use of intrinsically toxic materials such as pentachlorophenol, magnesium chlorate, etc., has fallen into disfavor because of the residual toxic effects on animals or on subsequent plantings. These materials are also unsuited for use on vegetable crops because of their hazardous nature. Use of ammonium salts alone or in combination with a surface active agent is disclosed and claimed for defoliation and desiccation in U.S. Pat. 3,152,879.

While the use of the aforementioned ammonium salt solutions are quite satisfactory under most circumstances, I have found that comparable and, under some conditions, more favorable desiccation and/or defoliation can be achieved by concentrated aqueous solutions of a soluble thiosulfate salt, e.g., ammonium thiosulfate or the incorporation of a soluble thiosulfate salt in prior art solutions utilized for desiccation and/or defoliation of plants.

It is an object of this invention to provide an improved method to satisfactorily desiccate leaves of growing plants to facilitate harvesting of the plant.

It is also an object of this invention to obtain a high degree of defoliation in combination with said desiccation.

It is a further object of this invention to provide a harmless composition having little or no residual toxic effects with such desiccation and/or defoliation.

Other and related objects will be apparent from the following disclosure.

I have found that a high degree of desiccation and, in some instances, defoliation, can be achieved by the application of aqueous solutions comprising thiosulfate salts. The thiosulfate can be added in the form of any soluble thiosulfate salt including the alkali metal, e.g., potassium, sodium, cesium, lithium, etc.; alkaline earth metal, e.g., magnesium, calcium, etc., as well as in the form of ammonium thiosulfate or mixtures of the aforementioned thiosulfates. The ammonium and potassium thiosulfates as well as mixtures thereof, however, are preferred.

The above thiosulfate salt can comprise the sole desiccation and/or defoliation agent or can be incorporated in aqueous solutions comprising other solutes utilized for desiccation and/or defoliation. It has been found that incorporation of certain thiosulfates, particularly ammonium thiosulfate, enhances the effectiveness of other solutes used for desiccation and/or defoliation. Among the other solutes used for desiccation and/or defoliation the preferred are the ammonium salts, e.g., ammonium nitrate, ammonium sulfate or ammonium chloride, as well as combinations thereof. The defoliant-desiccant composition can comprise from 5 to about 50, preferably from 15 to 45 weight percent of any of the aforementioned ammonium salts. The preferred ammonium salt is ammonium nitrate and hence a preferred solution is one comprising ammonium or potassium thiosulfate added to an ammonium nitrate solution. The combination of ammonium chloride and nitrate, ammonium sulfate and nitrate or ammonium sulfate, nitrate and chloride can also be used. Thus about 5 to 25 weight percent ammonium chloride and/or ammonium sulfate can be added to the commercially available "20–0–0" ammonium nitrate solution (57 weight percent solute) to provide mixed salt solutions. Other solutions having from 0 to about 30 weight percent ammonium chloride, from 0 to about 55 weight percent ammonium sulfate and from about 0 to 65 weight percent ammonium nitrate can be applied with the thiosulfate salt to the foliage in accordance with my invention. An example of another solute having a high activity for desiccation and defoliation is lithium chloride and this solute can also be used in combination with the aforementioned thiosulfate salts at a concentration from 5 to 50, preferably from 15 to 45, weight percent of the desiccant-defoliant solution.

The above materials are applied as aqueous solutions and should contain a sufficient quantity of water to achieve thorough coverage of the plant tissue. The solutes, however, should not be applied in too dilute solutions or the solute will be washed from the leaves. The maximum concentration of the solutes is not particularly limiting and even supersaturated solutions which contain suspended solute crystals can be used provided that sufficient liquid is present to adequately distribute the salt on the plant leaves. Generally, solutions or slurries containing from about 5 to about 80 weight percent solute are used with a maximum solute content of the slurries being about 20 weight percent. Preferably, however, the maximum solute content is the salting out concentration of the solution at the ambient temperature to avoid the difficulties inherent in the handling of a slurry. This concentration is about 55 weight percent ammonium thiosulfate, 65 weight percent ammonium nitrate, 55 weight percent ammonium sulfate, 45 weight percent lithium chloride, and about 30 weight percent ammonium chloride. The salting out concentration of the aforementioned salts of this invention or combinations thereof is well known in the art or can be readily ascertained. Preferably, the concentration of the solute should be at least 10 and most preferably at least 15 weight percent. In the case where ammonium thiosulfate or the other thiosulfate salts comprise the sole desiccation and/or defoliation solute, concentrations from 10–70 weight percent solute are preferred. In the case where a thiosulfate is added with one or more of the above solutes, the thiosulfate salt is added in an amount comprising from 5–50 weight percent, preferably from 10 to about 35 weight percent of the solution.

The choice of these solution concentrations depends somewhat on the method of application since the most concentrated solution containing from about 30 to 80 weight percent are preferred for aerial application, where the airplane's capacity generally limits the total volume of solution applied per acre to no greater than about 15 gallons per acre and frequently no greater than 10 gallons per acre. Commercial ground spray equipment do not have a limited spray capacity and therefore even more dilute solutions can be effectively applied by this equipment. The dosage of the aqueous solutions or slurries should be sufficient to provide between about 10 and about 250 pounds per acre of the crop to be treated, preferably between about 45 and 250 pounds per acre.

Preferably a surface active agent is added to the salt solutions to improve their effect. The agent can be used in an amount from 0.1 to about 5; preferably from 0.5 to 2 weight percent. I have found that the presence of the surface active agent achieves a more uniform and consistent effect. In general, any suitable surface active agent can be used such as the cationic, anionic and non-ionic types, as well as mixtures thereof.

Examples of the cationic surfactants include: fatty amines, e.g., dodecylamine, octadecylamine (Armeens, Duomeens of Armour Chemical Company); alkarylamines, e.g., dodecyl aniline, fatty amides such as fatty imidazolines, e.g., undecylimidazoline prepared by condensing lauric acid with ethylene diamine or oleylaminodiethylamine prepared by condensing oleic acid with asymmetric diethylene diamine Sapamine CH by Ciba); quaternary alkyl and aryl ammonium salts and hydrates, e.g., cetyltriethyl ammonium cetyl sulfate, dimethylbenzyldodecyl ammonium chloride, etc.; quaternary ammonium bases of fatty amides of disubstituted diamines, e.g., oleyl methylamino ethylene diethylamine methyl sulfate (Sapamine MS by Ciba), oleylbenzylamine ethylene diethylamine hydrochloride (Sapamine BCH by Ciba); fatty derivates of benzimidazolines such as are prepared by condensation of a fatty acid with orthophenylenediamine followed by alkylation of the condensate with an alkyl halide to yield an N-alkyl alkylbenzimidazole, e.g., N-methyl N'N'-diethyl heptadecylbenzimidazole; N-fatty alkyl pyridinium compounds, e.g., lauryl pyridinium, octadecyl pyridinium (Fixanol of Imperical Chemical Industries), octadecyl methylene pyridinium acetate; etc. Examples of useful anionic surface active agents include the following: fatty acid glyceride sulfonates and fatty acid sulfonates, e.g., sulfonated cottonseed oil, sulfonated oleic acid, sulfonated sperm oil, sulfonated tallow, etc.; sulfonated fatty amides, e.g., sulfonated amide of ricinoleic acid (Hemectol CA by I. G. Farben), sodium salt of sulfuric ester of oleyl diisobutyl amide (Dismulgen V of I. G. Farben), etc.; sulfonated anilides of fats, e.g., sodium salt of sulfuric ester of oleylethyl anilide (Humectol CX by I. G. Farben), etc.; amides of aminosulfonic acids, e. g., sodium sulfonate of oleylmethyl tauride (Igapon T by I. G. Farben); amides from condensation of fatty acid chlorides with amino acids, e.g., sodium salt of oleyl sarcoside (Medialan A by I. G. Farben); sulfonated aromatic hydrocarbons, e.g., benzene sulfonic, naphthalene sulfonic acids and their ammonium and alkali metal salts, etc.; alkylaryl sulfonates, e.g., dodecylbenzene sulfonates, octadecylbenzene sulfonates, etc.

Illustrative non-ionic compounds include the polyethylene oxide condensates with hydrophobic groups having a reactive hydrogen. The hydrophobic group can have from about 8 to 25 carbon atoms and from 2 to about 15 molecular weights of a hydrophobic group. The hydrophobic group can be selected from a variety of organic compounds having one or more reactive hydrogens including fatty alkyl or alkenyl alcohols, fatty acids, fatty amines, fatty amides, esterified hexitans or alkyl or alkenyl phenols.

As described, the source of the hydrophilic group is ethylene oxide. Other materials can be employed, for example, ethylene chlorohydrin or polyethylene glycol; however, because of its low cost and availability, ethylene oxide is used almost exclusively in the preparation of these materials.

One class of hydrophobic group comprises alkyl or alkenyl phenols wherein the alkyl or alkenyl group or groups contain between about 2 and about 16 carbon atoms. Among such compounds are the following: hexyl phenol, hexenyl phenol, hexadecyl phenol, dodecenyl phenols, tetradecyl phenol, heptenyl cresol, octyl and octenyl cresol, lauryl cresol, isoamyl cresol, decyl resorcinol, octenyl resorcinol, isododecyl phenol, decenyl xylenol, etc. Examples of commercially available wetting agents belonging to this class and containing ethylene oxide units are: "Antarax A–201" of the Antara Chemical Company and "Lavacol" of The General Dyestuff Corporation.

A second class of hydrophobic groups comprises fatty acids containing between about 12 and about 22 carbon atoms. Examples of such fatty acids are the following: lauric acid, tridecenoic acid, tetradecenoic acid, pentadecenoic acid, palmitic acid, oleic acid, nonadecanoic acid, docosanoic acid, etc. Examples of commercially available wetting agents having a fatty acid constituent and containing from about 4 to about 9 ethylene oxide units per acid group are the following: "Ninosol 100," "Ninosol 200" and "Ninosol 210" of the Alrose Chemical Compnay, and "Nopalco 4-D" of the Nopco Chemical Company.

A third class of hydrophobic groups comprises the alkyl and alkenyl alcohols containing between about 8 and about 22 carbon atoms. Among such alcohols are dodecanol, tridecanol, tetradecanol, pentadecanol, hexadecenol, heptadecenol, octadecenol, docosenol, etc. A commercially available nonionic setting agent of this type and containing ethylene oxide is Brij 30 of the Atlas Powder Company.

A fourth class of the hydrophobic groups comprises long chain alkyl or alkenyl amines or amides containing between about 8 and about 22 carbon atoms. These compounds contain two reactive hydrogens and the polyethylene oxide units are distributed therebetween. Examples of such compounds are dodecanamide, tridecyl amine, tetradecenamide, pentenyl amine, hexadecyl amine, heptadecanamide, octadecyl amine, oleyl amide, etc. Examples of commercially available wetting agents in this group containing ethylene oxide are "Ethomide" of the Armour Chemical Company and "Priminox 10" of the Rohm and Haas Chemical Company.

Another class of suitable wetting agents are the reaction products of ethylene oxide with fatty acid partial esters of hexitans. Such compounds are obtained by treating a hexitol, e.g., sorbitol, mannitol, dulcitol, etc., with a dehydrating agent to form the corresponding hexitan, i.e., sorbitan, mannitan, dulcitan, etc. The hexitan is then partially esterified with a long chain fatty acid having between about 8 and about 22 carbon atoms, such as dodecanoic acid, pentadecenoic acid, hexadecanoic acid, oleic acid, stearic acid, etc., to replace one of the reactive hydrogens of the hexitan with the carboxylic radical. The resultant partial ester is then reacted with ethylene oxide so as to add the desired number of ethylene oxide units per mol of the hexitan fatty ester. Commercially available compounds of this type and having a suitable balance between the hydrophobic and hydrophilic groups are "Tween 65" and "Tween 81" of The Atlas Powder Company.

Very suitable emulsifiers comprise the organic substituted ammonium salts of sulfodicarboxylic acids that are reacted with various hydrophobic groups such as fatty amides having 12 to 18 carbons to prepare half amides in the manner described in 2,976,209 or with fatty amines having 12 to 26 carbons to prepare half amides in the manner described in 2,976,211, or with polyethoxylated fatty amines in the manner described in 3,080,280, or with fatty acid esters of hydroxyl amines to obtain half amides in the manner described in 2,976,208.

A preferred emulsifier is described in U.S. Pats. 3,236,626 and 3,236,627 and comprises the amine salts of a sulfodicarboxylic acid half ester of an alkylphenoxy ethoxy alcohol. These emulsifiers have the following structure:

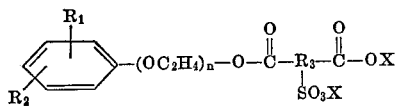

wherein:

$R_1$ is selected from the class consisting of alkyl and alkenyl groups;

$R_2$ is selected from the class consisting of hydrogen, alkyl and alkenyl groups;

$R_3$ is selected from the group consisting of trivalent sulfoalkylene and sulfo-alkenylene groups;

X is an organic aryl, alkyl and heterocyclic amine cation having from 1 to about 6 carbon atoms;

$n$ is an integer between about 2 and about 5;

and the total of carbons in any $R_1$, $R_2$, $R_3$ group is less than about 12; and preferably less than about 6.

Examples of suitable radicals from which $R_1$ and $R_2$ can be selected are the following: methyl, ethyl, propyl, isopropyl, butenyl, isobutyl, amyl, isoamyl, heptenyl, isoheptenyl, octyl, isooctenyl, nonyl, isononyl, decenyl, isodecyl, undecyl, isoundecenyl, dodecyl, isododecyl, etc.

Examples of various $R_3$ groups are the following: methylene, ethylene, propylene, isopropylene, butylene, isobutylene, pentylene, isopentylene, hexylene, isohexylene, etc.

Various organic amine cations can be used for X such as the primary, secondary and tertiary alkyl, alkaryl and aryl amines as well as heterocyclic compounds containing a basic nitrogen. Examples of suitable amines are the following: methylamine, dimethylamine, ethylamine, triethylamine, diethyl benzyl amine, propylamine, isopropylamine, diisopropylamine, ethylpropylamine, butylamine, isobutylamine, diisoamylamine, hexylamine, heptylamine, isooctylamine, furanamine, benzylamine, morpholine, pyridine, etc. Preferred are the alkylamines having between 1 and about 6 carbons, e.g., isopropylamine.

Examples of various compounds useful as emulsifiers in my invention are the following: half isobutyl amine salt, half tetraethoxy xylenol ester of sulfo-gluteric acid; half isopropyl amine salt, half triethoxy amyl phenol ester of sulfo-adipic acid; half amyl amine salt, half pentaethoxy cresol ester of sulfo-pimelic acid; half hexylamine salt, half diethoxyoctyl phenol ester of sulfo-suberic acid; half isopropylamine salt, half diethoxy dodecyl phenol ester of sulfo-azelaic acid; half heptylamine salt, half diethoxy dodecyl phenol ester of sulfo-sebasic acid, etc.

Of the aforedescribed emulsifier compounds, the most preferred are those in which the total of carbons in any $R_1$, $R_2$ or $R_3$ group is less than 4 and the number of carbons in the $R_3$ group is 2 or 3. In this most preferred group, $n$ preferably equals two.

The aforementioned emulsifiers are readily prepared by reacting at about 100° C. an unsaturated acid anhydride, e.g., maleic anhydride with a hydrophobic group comprising polyethylene oxide condensate on an alkylphenol. The resultant half ester is then reacted with an organic amine to prepare the salt which is reacted in an alcohol or aqueous media at 60°–85° C. with an amine bisulfide to add the amine sulfonate group to the olefinic bond of the dicarboxylic acid. The aforementioned emulsifiers are also available from the Witco Chemical Company under Emcol H2A or AL40-09 designation.

The invention can be applied to a wide variety of crops to facilitate their mechanical harvesting such as cotton, potatoes, sugar beets, sugar cane, peppers, milo, flowering plants such as roses, pineapple, alfalfa, tomatoes, grapes, etc. When the crop for harvesting comprises a cellulose fiber product such as cotton, slight amounts of phosphates, preferably ammonium phosphates can also be incorporated into the solution to impart a flame proofing to the cellulose. Examples of suitable ammonium phosphates are mono- and di-ammonium orthophosphates, ammonium pyrophosphate, ammonium tripolyphosphate, etc. The amount of ammonium phosphate can be from about 1 to about 15 weight percent and preferably from about 5 to about 12 weight percent.

The following compositions will illustrate solutions that can be used to defoliate and/or desiccate leaves of mature plants in accordance with my invention and it should be understood that other ingredients such as other desiccants or defoliants, and/or the aforementioned surfactants, emulsifiers and/or phosphates may be, but need not necessarily be, incorporated in the compositions:

TABLE 1

Composition 1

| | Weight percent |
|---|---|
| Ammonium thiosulfate | 58.0 |
| Water | 42.0 |

Composition 2

| | |
|---|---|
| Ammonium thiosulfate | 58.0 |
| Emcol AL 40-09 | 1.0 |
| Water | 41.0 |

Composition 3

| | |
|---|---|
| Lithium chloride | 17.5 |
| Ammonium thiosulfate | 35.0 |
| Emcol H2A | 0.5 |
| Water | 48.0 |

Composition 4

| | |
|---|---|
| Ammonium nitrate | 45.0 |
| Ammonium thiosulfate | 20.0 |
| Emcol H2A | 2.0 |
| Water | 33.0 |

Composition 5

| | |
|---|---|
| Ammonium nitrate | 50.0 |
| Ammonium chloride | 15.0 |
| Potassium thiosulfate | 10.0 |
| Water | 25.0 |

Composition 6

| | |
|---|---|
| Ammonium sulfate | 35.0 |
| Magnesium thiosulfate | 50.0 |
| Water | 15.0 |

Composition 7

| | |
|---|---|
| Ammonium nitrate | 65.0 |
| Lithium thiosulfate | 5.0 |
| Water | 30.0 |

Composition 8

| | |
|---|---|
| Ammonium nitrate | 52.0 |
| Ammonium sulfate | 10.0 |
| Sodium thiosulfate | 10.0 |
| Water | 28.0 |

Composition 9

| | |
|---|---|
| Ammonium nitrate | 35.0 |
| Ammonium thiosulfate | 25.0 |
| Water | 40.0 |

Composition 10

| | |
|---|---|
| Ammonium nitrate | 50.0 |
| Calcium thiosulfate | 20.0 |
| Water | 30.0 |

Composition 11

| | |
|---|---|
| Ammonium nitrate | 44.6 |
| Ammonium thiosulfate | 11.0 |
| Emulsifier H2A | 1.0 |
| Water | 43.4 |

Composition 12

| | |
|---|---|
| Potassium thiosulfate | 15.0 |
| Ammonium nitrate | 30.0 |
| Ammonium sulfate | 20.0 |
| Emulsifier H2A | 1.0 |
| Water | 34.0 |

The following examples will illustrate a mode of practice of my invention:

EXAMPLE 1

The test solutions were applied to a plot of cotton plants varying in height from 36 to about 60 inches. The cotton was of harvesting maturity at the time of application of the solution and had an average petiole salt content, expressed as nitrate, of 762 parts per million. The solutions were sprayed from a hand-pushed rig equipped with five 65° T-Jet nozzles. The rig had upright standards and an overhead yoke that straddled the cotton row and the 5-nozzles were placed on the rig to direct their spray to the center, thereby forming a 5-pointed star spray pattern about the cotton plants.

The test solutions were applied at a rate of 20, 10 and 5 gallons per cotton acre and the cotton was observed for combined defoliation and desiccation after 5 days. The following data were obtained:

TABLE 2

| Solution | Application rate, gallons/acre | Effectiveness[1] rating |
|---|---|---|
| Composition 2 (ammonium thiosulfate) | 20 | 9 |
|  | 10 | 7 |
|  | 5 | 5 |
| Composition 3 (lithium chloride and ammonium thiosulfate) | 20 | 9 |
|  | 10 | 7 |
|  | 5 | 7 |
| 57% ammonium nitrate | 20 | 9 |
| 1% Emcol H2A | 10 | 5 |
| Sodium chlorate | 3 | 8 |
| Untreated | 0 | 3 |

[1] The "Effectiveness rating" is on a scale of 0 to 10 wherein 10 represents complete defoliation and/or desiccation.

The data from the preceding example demonstrates that concentrated thiosulfate salt solutions alone or in combination with ammonium salts or lithium chloride are highly effective desiccants and defoliants for mature cotton plants.

EXAMPLE 2

Test solutions were also applied to a plot of peppers that were ready for harvesting. The solutions were applied with the spray rig described in the preceding example and were applied to rows of the pepper plants approximately 3 feet in length. The solutions were applied at 40, 20 and 10 gallons per pepper acre and the following results were obtained:

TABLE 3

| Solution | Application rate, gallons/acre | Effectiveness rating |
|---|---|---|
| 57% ammonium nitrate | 40 | 8 |
|  | 20 | 6 |
|  | 10 | 3 |
| Composition 1 (58% ammonium thiosulfate) | 40 | 9 |
|  | 20 | 8 |
|  | 10 | 9 |
| Composition 11 (44.6% ammonium nitrate and 11.0% ammonium thiosulfate) | 40 | 8 |
|  | 20 | 6 |
|  | 10 | 3 |

The data obtained from this test evidences that ammonium thiosulfate is also highly effective as a desiccant for peppers and is particularly advantageous at the low application rates of about 10 to about 20 gallons per acre. Hence, a preferred mode of practice is applying a highly concentrated solution of ammonium thiosulfate (45–70%) to the crop to be harvested at an application rate of about 5 to about 25 gallons per acre.

EXAMPLE 3

The test solutions were applied to a plot of cotton plants varying in height from approximately 30 to 48 inches. The cotton was of harvesting maturity at the time of application of the solutions which were sprayed from a hand-pushed rig equipped with five 65° T-Jet nozzles. The rig had upright standards and an overhead yoke that straddled the cotton row and the five nozzles were placed on the rig to direct their spray to the center thereby forming a five-pointed star spray pattern about the cotton plants.

The test solutions applied at a rate of 10 and 20 gallons per cotton acre and the cotton was observed for combined defoliation and desiccation after 24 hours and after 1 week. The following data were obtained from a test of ammonium nitrate, ammonium nitrate plus the preferred emulsifier and ammonium nitrate with ammonium thiosulfate:

TABLE 4

| | Solution | Application rate, gallon/acre | Percent effectiveness[1] 24 hours | Percent effectiveness[1] 1 week |
|---|---|---|---|---|
| 1 | 57 percent ammonium nitrate | 10 | 50 | 40 |
| 2 | do | 20 | 80 | 80 |
| 3 | 57 percent ammonium nitrate, 0.5 percent Emcol H2A | 10 | 20 | 50 |
| 4 | do | 20 | 80 | 80 |
| 5 | 45.7 percent ammonium nitrate, 0.5 percent Emcol H2A; 7.0 percent ammonium thiosulfate | 10 | 40 | 40 |
|  |  | 20 | 70 | 90 |

[1] Sum of percent leaves defoliated plus the multiple of the percent leaves desiccated times the quantity 100 minus percent leaves defoliated.

The preceding example illustrates a mode of practice of my invention and demonstrates the results obtainable thereby, in particular illustrates the improvement necrosis achieved at the preferred rate of application of 20 gallons per acre.

EXAMPLE 4

Aerial application of the compositions of my invention was performed on a test plot of cotton, each solution being applied to a strip of cotton 98 feet wide by one-quarter mile long on which the aircraft made three passes. The application rate, formulations tested and results are presented in the following table:

TABLE 5

| Solution | Application rate, gallon/acre | Results Desiccation, percent | Results Defoliation, percent | Total |
|---|---|---|---|---|
| 1. 57 percent ammonium nitrate, 0.5 percent Emcol H2A. | 8.3 | 50 | 50 | 75 |
| 2. ......do...... | 5.6 | 20 | 10 | 38 |
| 3. 45.7 percent ammonium nitrate, 1.0 percent Emcol H2A, 7.0 percent ammonium thiosulfate. | 8.3 | 90 | 30 | 93 |
| 4. ......do...... | 5.6 | 50 | 30 | 65 |

The preceding demonstrates the substantial improvement in desiccation and defoliation which can be secured by my invention and show that the presence of the thiosulfate improves both the desiccation and total effectiveness of the treatment.

EXAMPLE 5

The compositions of my invention were applied to a test plot of cotton with a conventional crop dusting airplane. The cotton had previously been treated with commercial magnesium chlorate without any successful defoliation. The cotton was very rank and had a history of resistance to desiccants and defoliants.

The solutions were applied at 15 gallons per acre. The weather was cold (31°–52° F.) and humid. The solutions were applied immediately after a ground fog lifted sufficiently to permit flying and about 20 hours after application the test area received about 0.2 inch of rain.

The solutions applied and the results obtained are set forth in the following table:

TABLE 6

| Solution | Results |
|---|---|
| 1. 57 percent ammonium nitrate 1 percent Multifilm X-77.[1] | Moderate desiccation. |
| 2. 45.7 percent ammonium nitrate, 1.0 percent Multifilm X-77; 7.0 percent ammonium thiosulfate. | Severe and rapid desiccation. |
| 3. 36.5 percent ammonium nitrate, 5.5 percent ammonium thiosulfate; 11.0 percent ammonium chloride; 1.0 percent Emcol H2A. | Severe and rapid desiccation and moderate defoliation. |

[1] A nonionic surfactant; reaction product of an alkylphenol with ethylene oxide.

The above experiments demonstrate that the addition of a thiosulfate salt, e.g., ammonium thiosulfate, to the prior art solutions significantly improves the effectiveness of the solutions as a desiccant and/or defoliant for mature plants. It should be noted that amounts of ammonium thiosulfate in quantities of about 5 to 15 weight percent improve the effectiveness of the prior art ammonium salt solutions and, therefore, a preferred embodiment of the invention is the use of prior art ammonium salt solutions including 5 to 15 weight percent of a thiosulfate, preferably ammonium or potassium thiosulfate.

The examples of and illustrative compositions useful in my invention are not to be construed as unduly limiting of my invention but are intended solely to illustrate the invention and set forth a mode of practice thereof.

I claim:

1. The method of defoliating and desiccating plants which comprises applying to the foliage of said plants an effective amount of an aqueous solution of salts, said solution comprising (a) 15–65% by weight of ammonium nitrate, ammonium chloride or ammonium sulfate, or mixtures thereof, and (b) 5–50% by weight of ammonium thiosulfate, an alkali metal thiosulfate or an alkaline earth metal thiosulfate, with the total concentration of the (a) and (b) salts being 20–80% by weight.

2. The method of claim 1 wherein said (a) salt is ammonium nitrate.

3. The method of claim 2 wherein said solution also contains a surface active agent.

4. The method of claim 2 wherein the thiosulfate is ammonium thiosulfate.

5. The method of claim 1 wherein said solution contains a mixture of ammonium nitrate and ammonium chloride.

6. The method of claim 1 wherein said solution is applied to said plants at a rate to provide a rate of about 45–250 lbs. of said salts per acre.

References Cited

UNITED STATES PATENTS

| | | | |
|---|---|---|---|
| 1,803,157 | 4/1931 | Wesenberg et al. | 71—65 |
| 2,726,149 | 12/1955 | Boyd | 71—69 |
| 3,152,879 | 10/1964 | Yale | 71—69 |
| 3,457,062 | 7/1969 | Young | 71—70 |
| 3,515,535 | 6/1970 | Lindley | 71—65 |

OTHER REFERENCES

Federal Register 30, 9002 (1965).

LEWIS GOTTS, Primary Examiner

M. M. KASSENOFF, Assistant Examiner

U.S. Cl. X.R.

71—DIG. 1